W. I. GARRETT.
DRAIN PAN.
APPLICATION FILED NOV. 23, 1920.

1,396,416. Patented Nov. 8, 1921.

INVENTOR.
W. I. Garrett

ATTORNEYS.

UNITED STATES PATENT OFFICE.

WILLIAM IRA GARRETT, OF UNION CITY, TENNESSEE, ASSIGNOR TO GARRETT DRAIN PAN COMPANY, OF UNION CITY, TENNESSEE, A CORPORATION OF TENNESSEE.

DRAIN-PAN.

1,396,416.   Specification of Letters Patent.   Patented Nov. 8, 1921.

Application filed November 23, 1920. Serial No. 426,037.

*To all whom it may concern:*

Be it known that I, WILLIAM IRA GARRETT, a citizen of the United States, residing at Union City, in the county of Obion and State of Tennessee, have invented certain new and useful Improvements in Drain-Pans; and I do hereby declare the following to be a full, clear, and exact description of the invention, such as will enable others skilled in the art to which it appertains to make and use the same.

This invention relates to improvements, particularly in meat drain-pans, while it is adapted for various purposes, as for instance, to drain cooked vegetables and for cooking purposes generally.

It has for its object to provide a utensil of the aforesaid type characteristic for its simplicity, lightness, of being readily and cheaply manufactured, is highly sanitary, adapted to be quickly cleaned, conveniently handled and to be kept in a clean condition.

Other objects of the invention, together with the foregoing, will be apparent from the following description of the construction, arrangement and use of the invention.

The invention therefore consists of certain instrumentalities and features of construction substantially as hereinafter more fully disclosed and clearly pointed out in the appended claims.

The accompanying drawing illustrates the preferred embodiment or one form of my invention wherein it will be understood that various changes and modifications as relate to the detailed construction and arrangement of parts may be made without departing from the spirit or scope of my invention as embraced in the claims, and in which drawings—

Figure 1:
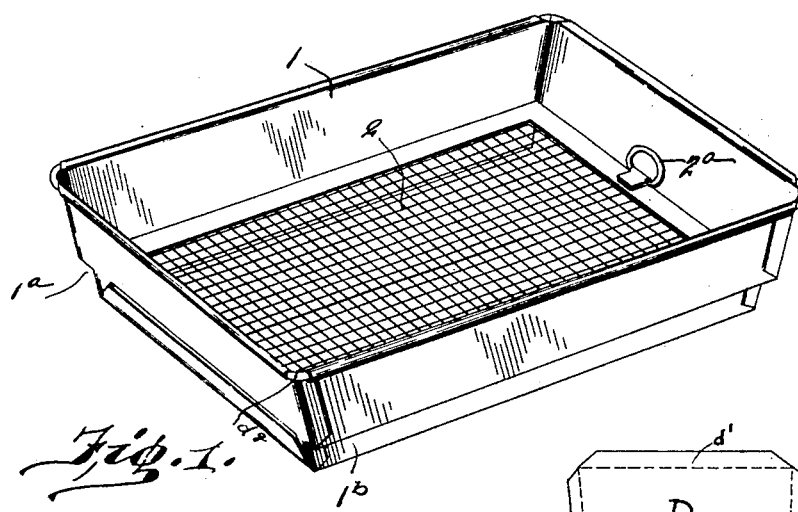
Figure 1 is a perspective view, partly broken away, of my drain-pan.

As characteristic features of my invention, I provide a receptacle or pan 1, preferably rectangular in general outline and having its side and end walls more or less tapered or inclined inwardly or toward their bottom edges. The pan or receptacle is of different cross-sectional areas, *i. e.*, the lower portion thereof is reduced in width to provide inner opposite ledges or shoulders $1^a$ therein, the purpose of which will be apparent later, the resultant contraction of the pan or receptacle $1^b$, serving as a drain chamber or compartment to receive especially the drained blood and water from pieces of meat placed thereabove as will also be later apparent.

A preferably reticulated, foraminous or strainer member 2, having a lifting ring or loop or hand-hold $2^a$, is adapted to be placed in the pan or receptacle 1, and supported or positioned upon the ledges or shoulders $1^a$ of the pan, which strainer-member serves particularly for supporting cut pieces of meat as in conducting meat or other like commodity business. The drainer member, it will be observed, while it provides for draining adhering blood and water from the cut pieces of meat, it also serves, as in the capacity of the usual drain-board, for conveniently displaying or exposing for sale the meat as generally resorted to in provision and grocery stores. Also, in addition to serving as a drain-board and means for displaying the meat or commodity as in placing it on sale, this device is further adapted to serve as a container for the meat, not only in thus displaying the meat, but also in transferring it back and forth to and from the provision-safe or refrigerator and the meat-bench, block or counter. Further, this device is also utilizable, as previously indicated, for culinary purposes, as for instance in draining cooked vegetables, also for cooking purposes generally. It is also simple, readily and cheaply manufactured, highly sanitary, easily kept clean, is light of construction and adapted to be moved or handled with facility.

It is also observed that by providing the pan or receptacle with the bottom reduced chamber $1^b$, a two-fold advantage is gained thereby, first, the blood and water drained from the cut pieces of meat are isolated or quarantined from the latter, thus preventing the bottom pieces of meat from becoming saturated by the blood, the ill effects of which are apparent and which my invention overcomes. Secondly, the pan or receptacle, itself, is adapted, by reason of the presence of the resultant shoulders or ledges $1^a$, to provide for supporting the drain member, thus obviating the use of additional separate instrumentalities for that purpose, as heretofore has been the case.

The receptacle or pan 1, as a structure, is preferably formed with its sides, ends and bottom stamped, it may be, with the use of die or otherwise, into a single piece, the corner-edges of the ends being preferably suitably lapped over and soldered to the sides, both at the greater and less cross sections thereof, the bottom proper being turned or lapped and soldered upon the ends, all as shown. It will be apparent that these details as relate to the assembling of the constituent parts of the pan or receptacle may be substituted by any other practical way of carrying out the same.

Figure 3:
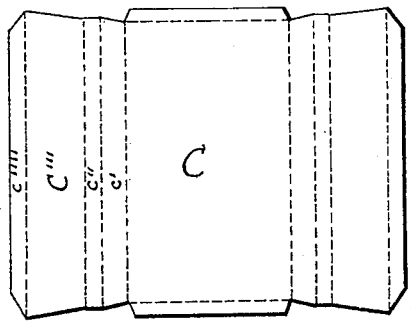
Fig. 3 is a view of the blank from which the bottom and side walls of the receptacle are formed.

Fig. 3 shows the blank C, from which the bottom and side walls and lateral extensions are formed. $c'$, $c''$, $c'''$, and $c''''$ represent respectively the portions of the blank which form the lower portion of the receptacle: $c''$, the portion of the receptacle which represents the ledge; $c'''$, the portion between the ledge and the bottom, $c''''$.

Figure 4:
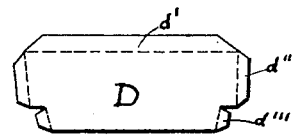
Fig. 4 is a view of the blank from which the ends of the receptacle are formed.
Figure 2:
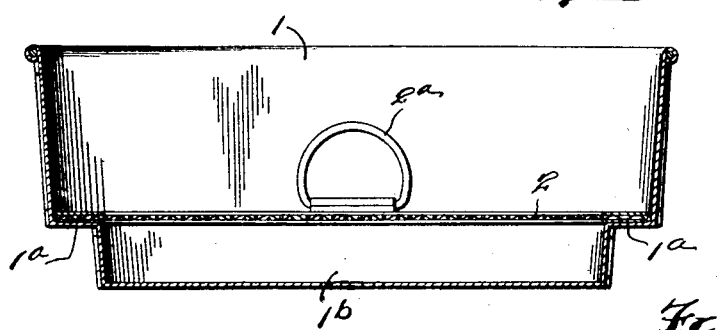
Fig. 2 is a vertical transverse section thereof.

Fig. 4 shows the blank D from which the end walls of the receptacle are formed. $d'$ is the portion of the blank, which, with the portion $c''''$ of the body portion forms the bead at the upper end of the receptacle which receives a strengthening wire $d^s$. $d''$ and $d'''$ represent the portions which form the projections, one above and the other below the ledge, for attaching the end walls to the side walls.

I claim:

1. A device of the type described comprising a central or body portion having its side walls bent to form a ledge, and pieces comprising the end walls, each edge of said end walls having two projecting portions secured to the body portion of the receptacle, the upper edges of the end and side walls, when bent into a vertical position to form a receptacle, being in the same plane.

2. A device of the type described comprising a central or body portion having its side walls bent to form a horizontal ledge, and pieces comprising the end walls, each edge of said end wall having two projecting portions secured to the body portion of the receptacle, above and below the horizontal ledge for attaching the end portions to the body portion.

3. A device of the type described comprising a central or body portion having its side walls bent to form a ledge, and pieces comprising the end walls, each edge of said end wall having two projecting portions secured to the body portion of the receptacle, and parts of the side and end portions above and below the ledge soldered or otherwise suitably secured to the side walls, in combination with a drain member which rests upon the side walls and extends to the end walls.

In testimony whereof, I affix my signature.

WILLIAM IRA GARRETT.

Witnesses:
WILL S. GODWIN,
L. B. McFADDEN.